Patented Mar. 11, 1924.

1,486,373

UNITED STATES PATENT OFFICE.

OTTO GERNGROSS AND HERMANN KAST, OF CHARLOTTENBURG, NEAR BERLIN-GERMANY, ASSIGNORS, BY MESNE ASSIGNMENTS, TO THE CHEMICAL FOUNDATION, INC., A CORPORATION OF DELAWARE.

COMPOSITION OF MATTER TO BE USED FOR THE MANUFACTURE OF SALTS OF ACETYL-SALICYLIC ACID.

No Drawing.   Application filed January 17, 1913.   Serial No. 742,695.

*To all whom it may concern:*

Be it known that we, OTTO GERNGROSS, a subject of the Emperor of Austria, residing at 10 Taunusstrasse, Grunewald, near Berlin, and HERMANN KAST, a subject of the Emperor of Germany, residing at 44/45 Kantstrasse, Charlottenburg, near Berlin, Germany, have invented a new and useful Composition of Matter to be Used for the Manufacture of Salts of Acetyl-Salicylic Acid; and we do hereby declare the following to be a full, clear, and exact description of the invention, such as will enable others skilled in the art to which it appertains to make and use the same.

Our invention relates to a new composition of matter to be used for the manufacture of salts of acetyl-salicylic acid.

The salts of acetyl-salicylic acid are easily decomposed. For instance an alkali splits off the acetyl-group and an acid the metal.

Therefore it was supposed that the preparation of the salts of acetyl-salicylic acid could only be executed in an organic solvent in order to avoid any decomposition during the manufacturing process.

We have found that these salts may be manufactured in a watery solution without any decomposition and have described and claimed this process and the products in a former application (filed December 4, 1912, Serial No. 734,912).

Our present invention relates to a new composition of matter to be used for the manufacture of salts of acetyl-salicylic acid. This composition contains acetyl-salicylic acid as essential constituent and an admixture to be described below.

The term: "admixture" may be generally used to define the substances mixed with the acetyl-salicylic acid employed in our invention. This admixture may consist of one, two or an unlimited number of metal-combinations alone or mixed with suitable ingredients as hereafter specified.

As a combination of a metal we preferably use an oxide, carbonate, bicarbonate, silicate, halogenide (chloride and so on) any salt of an oxygen acid of sulphur, (sulphate, sulphite and so on) or of nitrogen (nitrate, nitrite) or of phosphorous (phosphate) a borate and so on. The terms: "combination of a metal or metal-combination" can be generally used to define substances herebefore mentioned.

One of these metal-combinations, also two or more of them, can be used in one mass and these metal combinations may contain either the same metal or different metals.

The admixture consisting of a metal-combination or of metal-combinations can be in any suitable proportion to the employed acetyl-salicylic acid, for instance the acetyl-salicylic acid can be employed in excess or in the required amount for forming salts, but the admixture (the metal-combination or metal-combinations) can also preferably be used in excess for instance 5–20 per cent over the required amount necessary for forming salts of acetyl-salicylic acid.

In order to carry out our invention practically, we can for instance proceed as follows:

Acetyl-salicylic acid and—as admixture— a combination of a metal the salt of which we intend to manufacture, are thoroughly mixed in solid or especially dried (water-free) state in any known manner. This mass as obtained can be used without any further treatment or it can be formed in any desired form, for instance: tablets, pastils, suppositories and so on. For this purpose the above described mass may be mixed with suitable ingredients adapted for rendering stable the pressed masses without damaging or decomposing the same, for instance: talcum, starch, some kinds of sugar, sodium chloride, bicarbonate of sodium, gelatine and so on. This mass is stable in the dry state and forms a salt or salts of acetyl-salicylic acid if it comes in contact or is mixed with water or with a watery liquid (for instance alcohol of any kind and degree, milk, coffee, tea, soup and so on).

Other suitable ingredients which increase the stability of the composition or which are allowable in the mixture without damaging or decomposing the composition, may be, if desired, added. For this purpose we add for instance means for improving the taste (any kind of sugar, NaCl, $NaHCO_3$ and so on), means for rendering the pressed mass more durable, such as starch and any kind of sugar, means for preventing the decomposition of the mass in the mixed and especially dried state (talcum, starch and so on) and other suitable means.

Water must be excluded in preparing the mass and in storing the same. Substances or combinations containing water of crystallization as crystallized soda or strong hygroscopic substances (for instance NaOH, KOH, $K_2CO_3, CaCl_2$) cannot be used.

As metal in the metal-combinations employed according to our invention we use an element of the alkali, alkaline-earth, rare earth-groups, of Mg, of Zn, of Hg, of Ag and so on. We declare that the invention is not restricted to the combinations of the cited elements and combinations of other elements can also be used.

The new composition of matter may serve as a medicament for internal or external use preferably after being dissolved in water or in a watery liquid such as hereinbefore mentioned. Also the product as a powder or in any kind of compressed form may be directly put into the mouth, the saliva acting as watery liquid.

Although the composition of matter may be produced by the process herein described or processes herein referred to the present invention is not confined to any particular process of production but is for the composition or mass as it may be obtained.

We claim:

1. A composition of matter comprising dry acetyl-salicylic acid, and a dry metal combination capable of reacting with acetyl-salicylic acid to form a metal acetyl-salicylate when brought into contact with a solvent.

2. A composition of matter comprising dry acetyl-salicylic acid, a dry metal combination capable of reacting with acetyl-salicylic acid to form a metal acetyl-salicylate when brought into contact with a solvent, and a dry moisture absorbing material.

3. A composition of matter comprising dry acetyl-salicylic acid, and a dry metal combination of the alkaline-earth group capable of reacting with acetyl-salicylic acid to form a metal acetyl-salicylate when brought into contact with a solvent.

In testimony whereof we affix our signatures in the presence of two witnesses.

OTTO GERNGROSS.
HERMANN KAST.

Witnesses:
WOLDEMAR HAUPT,
HENRY HASPER.